Patented Apr. 5, 1927.

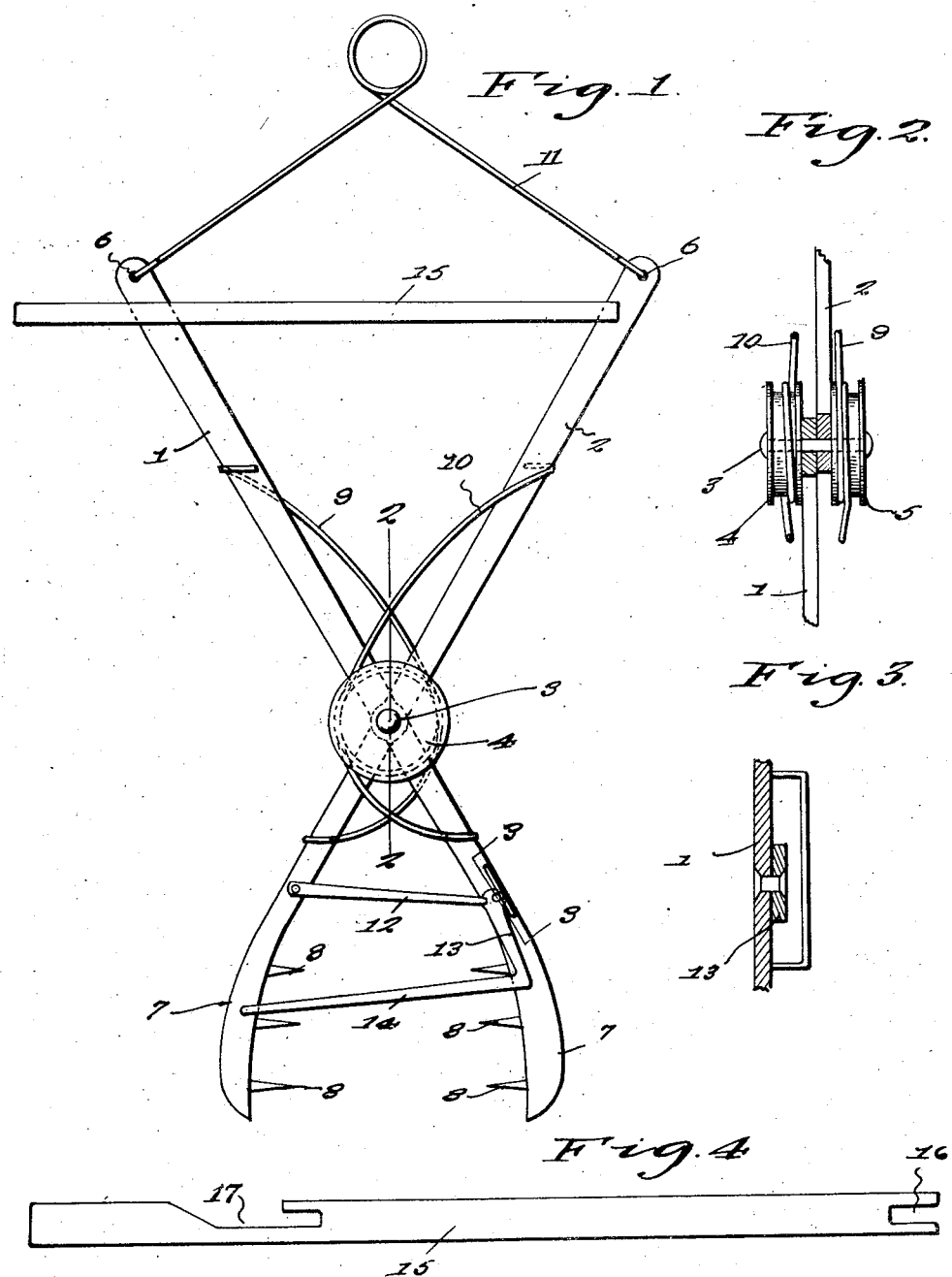

1,623,925

UNITED STATES PATENT OFFICE.

SAM C. KINZER, OF ESTILL, KENTUCKY.

TRAP.

Application filed November 19, 1926. Serial No. 149,420.

This invention relates to traps and more particularly to the grapple type for catching fish and water animals.

The primary object of the invention is to provide a trap than can be easily and expeditiously arranged in set position without fear of the trap springing to closed position and injuring the operator during the setting operation.

A further object of the invention is to provide a trap that is very effective in catching fish and the like, as slight pressure upon the releasing means will result in the springing of the trap.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a side elevation of the trap forming the subject matter of the present invention.

Figure 2 is a sectional view taken on line 2—2 of Figure 1.

Figure 3 is a sectional view taken on line 3—3 of Figure 1.

Figure 4 is a top plan view of the setting stick.

Referring to the drawings in detail the reference numerals 1 and 2 indicate arms which are crossed adjacent their central portion and pivotally secured together at their juncture by a headed pin 3 which extends beyond the sides of the arms to receive the grooved pulleys 4 and 5 as best shown in Figure 2.

Openings 6 are formed in one end of the arms, while the opposite ends are slightly enlarged to provide arcuate jaws 7 which slightly curve toward each other and extending from the confronting sides of the jaws are pointed penetrating spikes 8 arranged in superposed relation on each jaw to cooperate in securely holding the catch when the trap is sprung.

Secured to each arm upon opposite sides of the pivot point thereof are the ends of springs 9 and 10 which are formed with a convolution between their ends to encircle the pulleys 4 and 5 journaled to the pin 3. The spring 10 is arranged on the pulley 4, while the spring 9 is received by the pulley 5. The springs 10 and 9 tend to cause the jaws to close and to assist the said springs is an auxiliary spring 11 having its ends secured to the openings 6 and formed with a convolution as shown in Figure 1.

The trip mechanism includes a link 12 having one end pivotally secured to the arm 2 and its opposite end is free to engage the trigger 13 to hold the latter in operative position. The trigger 13 has one end secured to the arm 1 at a point opposite the connecting point of the link 12 with the arm 2 and is formed with a tapered right angled disposed bait receiving arm 14. A U-shaped guide has its ends secured to the arm 1 in a manner to arrange the guide in the path of the link 12 to receive the latter when the trip is sprung and to arrange the same out of the path of the jaws.

When it is desired to set the trap, the arms are sprung apart against the tension of the springs and a setting stick 15 is disposed between the arms and formed with the bifurcated end 16 to receive one arm and a recess 17 adjacent its opposite end to receive the other arm. When the stick 15 is cooperatively associated with the arms as shown in Figure 1, the trap can be easily and quickly set without fear of being injured by the casual closing of the jaws as will be readily apparent.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A trap of the character described comprising crossed arms pivotally secured at their juncture, pulleys secured by the pivot means for the arms, springs secured to said arms and having convolutions received in said pulleys, and tripping means for holding one of the ends of said arms apart against the tension of said springs.

2. A trap of the character described comprising crossed arms, means for pivotally securing said arms in their crossed relation, pulleys secured to said means upon opposite sides of the crossed arms, a spring for each arm and having its ends secured thereto, a convolution included in each spring and surrounding the pulleys, jaws formed on one end of said arms, penetrating spikes extending from the confronting sides of said jaws, a spring having its ends secured to each arm and a tripping means for holding said jaws apart against the tension of said springs.

3. A trap of the character described comprising crossed arms, a pivot pin securing the arms in their crossed relation and having ends projecting beyond said arms, pulleys journaled to said pin, springs secured to said arms and being received by said pulleys, jaws formed on one of the ends of said arms, penetrating spikes extending from the confronting sides of said jaws, a tripping means including a link pivotally secured to one arm, and a trigger pivotally secured to the other of said arms in the path of said link whereby the latter normally holds the jaws in set position by engaging the trigger.

4. A trap of the character described comprising pivotally secured crossed arms, jaws formed on one of the ends of said arms, springs for normally urging said jaws together, spikes projecting from the confronting sides of said jaws and cooperating to receive a catch, a link pivotally secured to one of said arms, a trigger pivotally secured to the other arm at a point opposite the pivoted connection of the link and to be retained in operative position through the instrumentality of the link, and guide means for receiving the link when the trip is sprung.

In testimony whereof I affix my signature.

S. C. KINZER.